US008914500B1

(12) United States Patent
Liu et al.

(10) Patent No.: US 8,914,500 B1
(45) Date of Patent: Dec. 16, 2014

(54) CREATING A CLASSIFIER MODEL TO DETERMINE WHETHER A NETWORK USER SHOULD BE ADDED TO A LIST

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 34 days.

(21) Appl. No.: 13/476,532

(22) Filed: May 21, 2012

(51) Int. Cl.
*G06F 15/173* (2006.01)

(52) U.S. Cl.
USPC .......................................... 709/224; 709/223

(58) Field of Classification Search
CPC ....................................................... H04L 63/02
USPC .................................................. 709/223, 224
See application file for complete search history.

(56) References Cited

U.S. PATENT DOCUMENTS

| | | | |
|---|---|---|---|
| 5,901,255 A | 5/1999 | Yagasaki |
| 5,974,398 A | 10/1999 | Hanson et al. |
| 6,185,514 B1 | 2/2001 | Skinner et al. |
| 6,266,649 B1 | 7/2001 | Linden et al. |
| 6,269,351 B1 | 7/2001 | Black |
| 6,295,504 B1 | 9/2001 | Ye et al. |
| 6,487,538 B1 | 11/2002 | Gupta et al. |
| 6,539,375 B2 | 3/2003 | Kawasaki |
| 6,560,578 B2 | 5/2003 | Eldering |
| 6,567,797 B1 | 5/2003 | Schuetze et al. |
| 6,581,058 B1 | 6/2003 | Fayyad et al. |
| 6,598,054 B2 | 7/2003 | Schuetze et al. |
| 6,973,436 B1 | 12/2005 | Shkedi |
| 6,982,726 B1 | 1/2006 | Berestov |
| 7,003,566 B2 | 2/2006 | Codella et al. |
| 7,103,584 B2 | 9/2006 | Lee |
| 7,202,791 B2 | 4/2007 | Trajkovic |
| 7,203,909 B1 | 4/2007 | Horvitz et al. |
| 7,257,546 B2 | 8/2007 | Ebrahimi et al. |
| 7,272,065 B2 | 9/2007 | Lovett |
| 7,454,705 B2 | 11/2008 | Cadez et al. |
| 7,685,278 B2 | 3/2010 | Cohen et al. |

(Continued)

OTHER PUBLICATIONS

U.S. Appl. No. 13/362,671, filed Jan. 31, 2012, Jia Liu et al.

(Continued)

*Primary Examiner* — Quang N Nguyen
*Assistant Examiner* — Andrew Woo
(74) *Attorney, Agent, or Firm* — Foley and Lardner LLP; John D. Lanza (57) ABSTRACT

A computerized method of creating a classifier model to determine whether a network user should be added to a list of similar network users. A first list of network users, a second list of network users who are not on the first list of network users and characteristic data associated with the network users' network activity are received. A time period is designated. A first category of network activities performed by a network user on the first list within the designated time period is identified. A second category of network activities performed at any time by network users on the second list is identified. A third category of network activities performed by network users on the first list at a time outside of the designated time period is identified. The classifier model is generated based on the first, second and third categories of network activities.

18 Claims, 7 Drawing Sheets

(56) References Cited

U.S. PATENT DOCUMENTS

| | | |
|---|---|---|
| 7,693,836 B2 | 4/2010 | Brave et al. |
| 7,693,863 B2 | 4/2010 | Martin et al. |
| 7,711,735 B2 | 5/2010 | Wu et al. |
| 7,734,632 B2 | 6/2010 | Wang |
| 7,739,314 B2 | 6/2010 | Datar et al. |
| 7,769,786 B2 | 8/2010 | Patel |
| 7,809,740 B2 | 10/2010 | Chung et al. |
| 7,822,636 B1 | 10/2010 | Ferber et al. |
| 7,882,175 B1 | 2/2011 | Nayfeh et al. |
| 7,904,448 B2 | 3/2011 | Chung et al. |
| 7,908,238 B1 | 3/2011 | Nolet et al. |
| 8,026,944 B1 | 9/2011 | Sah |
| 8,027,964 B2 | 9/2011 | Boulis |
| 8,095,484 B2 | 1/2012 | Cheng et al. |
| 8,095,523 B2 | 1/2012 | Brave et al. |
| 8,117,211 B2 | 2/2012 | Yamamoto et al. |
| 8,131,733 B2 | 3/2012 | Wang |
| 8,260,656 B1 | 9/2012 | Harbick et al. |
| 8,321,934 B1 | 11/2012 | Cooley et al. |
| 8,370,321 B2 | 2/2013 | Chu et al. |
| 8,527,526 B1 | 9/2013 | Liu et al. |
| 8,566,422 B2 | 10/2013 | Johnson et al. |
| 8,655,695 B1 | 2/2014 | Qu et al. |
| 8,768,867 B1 | 7/2014 | Thaeler et al. |
| 2003/0033196 A1 | 2/2003 | Tomlin |
| 2003/0033336 A1 | 2/2003 | Gremmert |
| 2003/0220975 A1* | 11/2003 | Malik .......................... 709/205 |
| 2004/0030667 A1 | 2/2004 | Xu et al. |
| 2004/0090472 A1 | 5/2004 | Risch et al. |
| 2004/0215509 A1 | 10/2004 | Perry |
| 2005/0049907 A1 | 3/2005 | Kumar et al. |
| 2005/0086105 A1 | 4/2005 | McFadden et al. |
| 2006/0015487 A1 | 1/2006 | Vest |
| 2006/0026062 A1 | 2/2006 | Collins |
| 2006/0059144 A1 | 3/2006 | Canright et al. |
| 2006/0064411 A1 | 3/2006 | Gross et al. |
| 2006/0069612 A1 | 3/2006 | Hurt et al. |
| 2006/0069616 A1 | 3/2006 | Bau |
| 2006/0136294 A1 | 6/2006 | Linden et al. |
| 2006/0241923 A1 | 10/2006 | Xu et al. |
| 2006/0248035 A1 | 11/2006 | Gendler et al. |
| 2007/0038659 A1 | 2/2007 | Datar et al. |
| 2007/0061195 A1 | 3/2007 | Liu et al. |
| 2007/0067297 A1 | 3/2007 | Kublickis |
| 2007/0073579 A1 | 3/2007 | Immorlica et al. |
| 2007/0130005 A1 | 6/2007 | Jaschke |
| 2007/0156458 A1 | 7/2007 | Benja-Athon et al. |
| 2007/0156519 A1 | 7/2007 | Agassi et al. |
| 2007/0179846 A1 | 8/2007 | Jain et al. |
| 2007/0233556 A1 | 10/2007 | Koningstein |
| 2008/0071929 A1 | 3/2008 | Motte et al. |
| 2008/0108308 A1 | 5/2008 | Ullah |
| 2008/0126176 A1 | 5/2008 | Iguchi |
| 2008/0140524 A1 | 6/2008 | Anand et al. |
| 2008/0147659 A1 | 6/2008 | Chen et al. |
| 2008/0154717 A1 | 6/2008 | Saifee et al. |
| 2008/0189174 A1 | 8/2008 | Moore |
| 2008/0201216 A1 | 8/2008 | Almeida |
| 2008/0215348 A1 | 9/2008 | Guldimann et al. |
| 2008/0294584 A1 | 11/2008 | Herz |
| 2008/0300958 A1 | 12/2008 | Gluck |
| 2009/0006974 A1 | 1/2009 | Harinarayan et al. |
| 2009/0012852 A1 | 1/2009 | O'Kelley et al. |
| 2009/0048925 A1 | 2/2009 | Song et al. |
| 2009/0077495 A1 | 3/2009 | Bhat et al. |
| 2009/0164274 A1 | 6/2009 | Narayanaswamy et al. |
| 2009/0164395 A1 | 6/2009 | Heck |
| 2009/0222734 A1 | 9/2009 | Fuller et al. |
| 2009/0228397 A1 | 9/2009 | Tawakol et al. |
| 2009/0248494 A1 | 10/2009 | Hueter et al. |
| 2009/0265243 A1 | 10/2009 | Karassner et al. |
| 2009/0281923 A1 | 11/2009 | Selinger et al. |
| 2009/0292386 A1 | 11/2009 | Cheng et al. |
| 2009/0327032 A1 | 12/2009 | Gunawardana et al. |
| 2010/0004975 A1 | 1/2010 | White et al. |
| 2010/0042500 A1 | 2/2010 | Pritchard et al. |
| 2010/0042502 A1 | 2/2010 | Farmanfarmaian et al. |
| 2010/0082421 A1 | 4/2010 | Tuladhar et al. |
| 2010/0121671 A1 | 5/2010 | Boutilier et al. |
| 2010/0121850 A1 | 5/2010 | Moitra et al. |
| 2010/0131835 A1 | 5/2010 | Kumar et al. |
| 2010/0138291 A1 | 6/2010 | Silverman et al. |
| 2010/0169342 A1 | 7/2010 | Kenedy et al. |
| 2010/0217648 A1 | 8/2010 | Agarwal et al. |
| 2010/0228614 A1 | 9/2010 | Zhang et al. |
| 2010/0235241 A1 | 9/2010 | Wang et al. |
| 2010/0250558 A1 | 9/2010 | Wang |
| 2010/0262568 A1 | 10/2010 | Schwaighofer et al. |
| 2010/0274753 A1 | 10/2010 | Liberty et al. |
| 2010/0293057 A1 | 11/2010 | Haveliwala et al. |
| 2010/0318374 A1 | 12/2010 | Flake et al. |
| 2010/0325666 A1 | 12/2010 | Wiser et al. |
| 2011/0010324 A1 | 1/2011 | Bolivar et al. |
| 2011/0055008 A1 | 3/2011 | Feuerstein et al. |
| 2011/0055012 A1 | 3/2011 | Christianson et al. |
| 2011/0071900 A1 | 3/2011 | Kamath et al. |
| 2011/0077998 A1 | 3/2011 | Yan et al. |
| 2011/0106796 A1 | 5/2011 | Svaic |
| 2011/0145248 A1 | 6/2011 | Doliov |
| 2011/0153423 A1 | 6/2011 | Elvekrog et al. |
| 2011/0166926 A1 | 7/2011 | Lv et al. |
| 2011/0173198 A1* | 7/2011 | Malleshaiah et al. ......... 707/737 |
| 2011/0191176 A1 | 8/2011 | Merriman et al. |
| 2011/0191714 A1 | 8/2011 | Ting et al. |
| 2011/0225608 A1 | 9/2011 | Lopatecki et al. |
| 2011/0231241 A1 | 9/2011 | Kesari et al. |
| 2011/0231257 A1 | 9/2011 | Winters |
| 2011/0231264 A1 | 9/2011 | Dilling et al. |
| 2011/0246267 A1 | 10/2011 | Williams et al. |
| 2011/0246298 A1 | 10/2011 | Williams et al. |
| 2011/0258039 A1 | 10/2011 | Patwa et al. |
| 2011/0264522 A1 | 10/2011 | Chan et al. |
| 2011/0270560 A1 | 11/2011 | Wang et al. |
| 2011/0288937 A1 | 11/2011 | Manoogian, III et al. |
| 2012/0010939 A1 | 1/2012 | Krishnamoorthy et al. |
| 2012/0047013 A1 | 2/2012 | Bigby et al. |
| 2012/0047022 A1 | 2/2012 | Shamim et al. |
| 2012/0047132 A1 | 2/2012 | Fleming et al. |
| 2012/0054009 A1 | 3/2012 | Furman et al. |
| 2012/0059707 A1 | 3/2012 | Goenka et al. |
| 2012/0059717 A1 | 3/2012 | Furman et al. |
| 2012/0166530 A1 | 6/2012 | Tseng |
| 2012/0179543 A1 | 7/2012 | Luo et al. |
| 2012/0209568 A1 | 8/2012 | Arndt et al. |
| 2012/0239506 A1 | 9/2012 | Saunders et al. |
| 2012/0253928 A1 | 10/2012 | Jackson et al. |
| 2012/0271782 A1 | 10/2012 | Blowers et al. |
| 2012/0316972 A1 | 12/2012 | Hu et al. |
| 2013/0006778 A1 | 1/2013 | Raghunandan |
| 2013/0047076 A1 | 2/2013 | McElfresh et al. |
| 2013/0054628 A1 | 2/2013 | Meierhoefer et al. |
| 2013/0091001 A1 | 4/2013 | Jia et al. |
| 2013/0124259 A1 | 5/2013 | Chourey et al. |
| 2013/0124298 A1 | 5/2013 | Li et al. |
| 2013/0124449 A1 | 5/2013 | Pinckney et al. |
| 2013/0132415 A1 | 5/2013 | Adams |
| 2013/0151312 A1 | 6/2013 | Logan |
| 2013/0346182 A1 | 12/2013 | Cheng et al. |

OTHER PUBLICATIONS

U.S. Appl. No. 13/362,797, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012, Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
"Clustering II" Powerpoint, EECS435, Spring 2008, 25 pages.

(56) References Cited

OTHER PUBLICATIONS

Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Mark; "Confidence Intervals on Likelihood Estimates for Estimating Association Strengths", Brown University, Draft of May 28, 1999, 7 pages.
Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl—en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
U.S. Appl. No. 13/362,910, filed Jan. 31, 2012, Jia Liu et al.
U.S. Appl. No. 13/534,480, filed Jun. 27, 2012, Jia Liu et al.
U.S. Appl. No. 13/550,073, filed Jul. 16, 2012, Jia Liu et al.
U.S. Appl. No. 13/551,236, filed Jul. 17, 2012, Jia Liu et al.
Notice of Allowance on U.S. Appl. No. 13/462,130 dated Apr. 22, 2013.
Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/550,073 dated Jun. 3, 2013.
Office Action on U.S. Appl. No. 13/460,411 dated Jul. 15, 2014.
U.S. Notice of Allowance on U.S. Appl. No. 13/550,073 dated Jun. 27, 2014.
U.S. Office Action on U.S. Appl. No. 13/362,671 dated Jun. 30, 2014.
US Notice of Allowance in U.S. Appl. No. 13/534,480 Dtd Jul. 30, 2014.
US Notice of Allowance in U.S. Appl. No. 13/598,331 Dtd Jul. 31, 2014.
US Office Action in U.S. Appl. No. 13/462,425 Dtd Aug. 1, 2014.
Notice of Allowance on U.S. Appl. No. 13/551,236 dated May 22, 2014.
US Non Final OA on U.S. Appl. No. 13/363,353 dated Apr. 22, 2014.
US Non Final Office Action on U.S. Appl. No. 13/465,679 dated Apr. 14, 2014.
US Office Action on U.S. Appl. No. 13/362,910 dated Apr. 8, 2014.
Notice of Allowance on U.S. Appl. No. 13/551,236 dated Jan. 30, 2014.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/550,073 dated Oct. 22, 2013.
Office Action on U.S. Appl. No. 13/550,073 dated Feb. 10, 2014.
US Notice of Allowance on U.S. Appl. No. 13/598,331 dated Mar. 20, 2014.
Office Action on U.S. Appl. No. 13/363,356 dated Mar. 14, 2014.

* cited by examiner

CREATING A CLASSIFIER MODEL TO DETERMINE WHETHER A NETWORK USER SHOULD BE ADDED TO A LIST

BACKGROUND

The present disclosure relates generally to similar user identifiers.

From a content provider's perspective, placing content on a web page may or may not be of interest or useful for the end user viewing the web page. In some systems, the content of a web page may be used to help select more relevant content to be provided with the web page. For example, a manufacturer or retailer of golf clubs may place content on a website devoted to golf, since visitors to the website may share a common interest in golf. Such systems may use keywords located in the text of the website to identify topics discussed on the website.

SUMMARY

A computerized method for creating a classifier model to determine whether a network user should be added to a list of similar network users is described herein. A processing circuit receives a first list of network users and a second list of network users who are not on the first list of network users. Each network user is represented on the first and second list by a user identifier and characteristic data associated with the network user's network activity including a time period in which a network activity was performed. The processing circuit designates a time period of interest to the classifier model. The processing circuit identifies a first, second and third category of network activities. The first category of network activities includes at least one network activity performed by a network user on the first list of network users within the designated time period. The second category of network activities includes at least one network activity performed at any time by network users on the second list of network users. The third category of network activities includes at least one network activity performed by network users on the first list of network users at a time outside of the designated time period. Based on the first, second and third categories of network activities, the processing circuit generates the classifier model.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

According to some aspects of the present disclosure, the online behaviors of user identifiers may be used to provide audience-based advertising. As used herein, online behavior refers to how a user identifier interacts with web pages on the Internet (e.g., which web pages are visited, the order in which the web pages are visited, how long a particular web page is viewed, and similar information). In some implementations, a set of user identifiers associated with an online event (e.g., making an online purchase, being added to a content provider's list of user identifiers, etc.) may be used as a basis to determine user identifiers having similar online behaviors.

A user may opt in or out of allowing a content server to identify and store information about the user and/or about devices operated by the user. For example, the user may opt in to receiving content from the content server that may be more relevant to the user. Advertisements are one type of content. In some implementations, the user may be represented as a randomized user identifier (e.g., a cookie, a device serial number, etc.) that contains no personally-identifiable information about the user. For example, information relating to the user's name, demographics, etc., may not be used by the content server unless the user opts in to providing such information. Thus, the user may have control over how information is collected about him or her and used by a content server.

In content-based systems, content is provided based on the subject matter of a web page. For example, a web page devoted to golf may mention the terms "golf" and other golf-related terms. A content server that places content on the web page may use the subject matter of the web page itself and/or terms provided as part of a request for content (e.g., via a content tag embedded into the code of the web page), to determine a theme for the web page. Based on the determined theme, a retailer or manufacturer of golf clubs may opt to place content on the web page.

Audience-based systems, in contrast to content-based systems, involve selecting content based on the user identifier visiting a web page, instead of the subject matter of the web page itself. For example, a user identifier may be associated with making an online reservation at a golf resort and navigating to a financial web page to check the stock market. Based on golf being a potential interest category associated with the user identifier, for example, content from a retailer or manufacturer of golf clubs may be provided with the financial web page, even though the financial web page is unrelated to golf.

One or more implementations described herein provide a method that allows a processing circuit to create a classifier model to determine whether a network user should be added to a list of network users. The classifier model is constructed from at least one existing list provided by a content provider, such as a remarketing list. The classifier model is used to classify the browsing activities of candidate network users based on whether the browsing activities relate to similar topics or interests as the given remarketing list. The classifier model is generated based on a first, second and third category of network activities. The first category of network activities represents examples of characteristic data associated with a network user that should be added to the list of network users. The second and third categories of network activities represent examples of characteristic data associated with a network user that should not be added to the list of network users.

Figure 1:
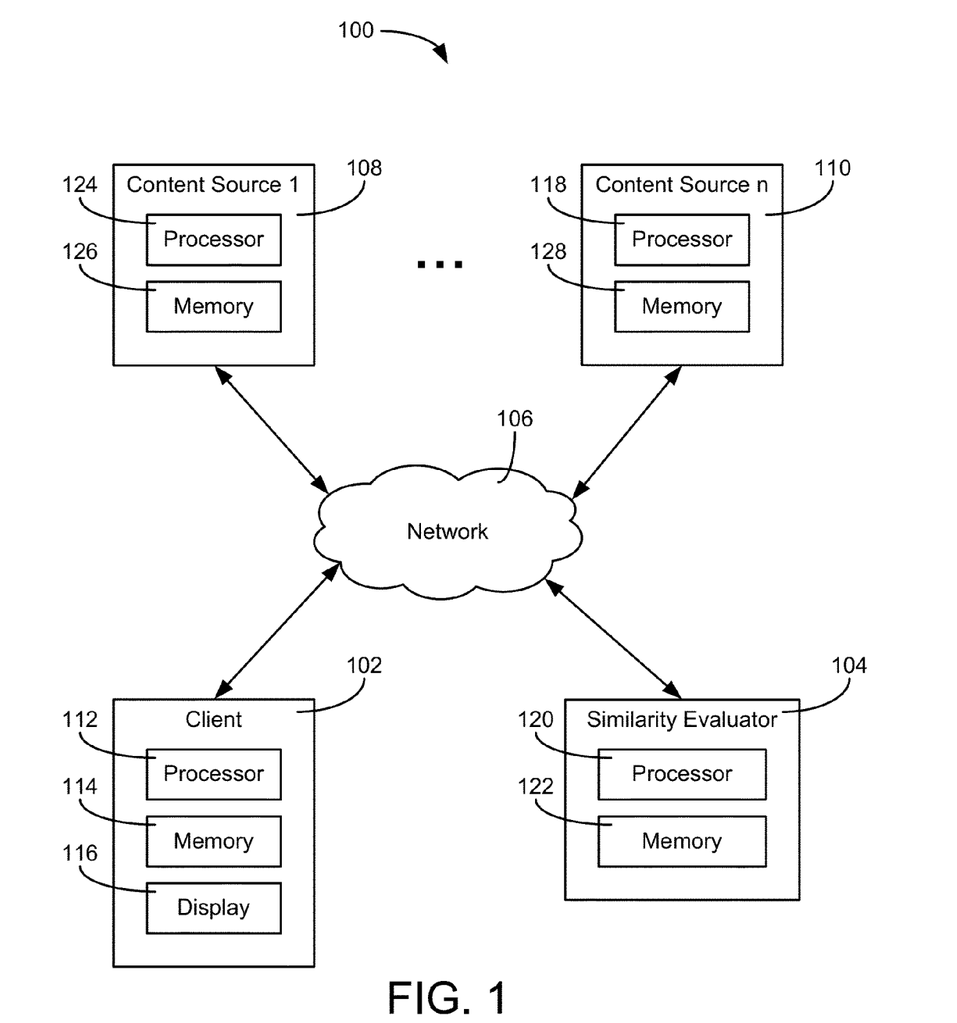
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. Client 102 may execute a web browser or other application (e.g., a video game, a messaging program, etc.) to retrieve content from other devices over network 106. For example, client 102 may communicate with any number of content sources 108, 110 (e.g., a first content source through nth content source), which provide electronic content to client 102, such as web page data and/or other content (e.g., text documents, PDF files, and other forms of electronic documents). In some implementations, computer system 100 may also include a similarity evaluator 104 configured to identify one or more similar user identifiers to those of a set of one or more other user identifiers. For example, a user identifier associated with client 102 may be identified as having similar characteristics as that of a set of other user identifiers. In such a case, similarity evaluator 104 may provide data to content sources 108, 110 that is used by content source 108, 110 to select relevant content for client 102. In other implementations, similarity evaluator 104 may itself select relevant content for client 102 based on the user identifier associated with client 102.

Network 106 may be any form of computer network that relays information between client 102, content sources 108, 110, and similarity evaluator 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays web pages and other forms of content received from content sources 108, 110 and/or similarity evaluator 104.

Content sources 108, 110 may be one or more electronic devices connected to network 106 that provide content to client 102. For example, content sources 108, 110 may be computer servers (e.g., FTP servers, file sharing servers, web servers, etc.) or combinations of servers (e.g., data centers, cloud computing platforms, etc.). Content may include, but is not limited to, web page data, a text file, a spreadsheet, an image file, and other forms of electronic documents. Similar to client 102, content sources 108, 110 may include processing circuits comprising processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Similarity evaluator 104 may be one or more electronic devices connected to network 106 and configured to determine the similarity between a client identifier associated with client 102 and one or more other client identifiers. Similarity evaluator 104 may be a computer server (e.g., FTP servers, file sharing servers, web servers, etc.) or a combination of servers (e.g., a data center, a cloud computing platform, etc.). Similarity evaluator 104 may include a processing circuit including a processor 120 and a memory 122 that stores program instructions executable by processor 120. In cases in which similarity evaluator 104 is a combination of computing devices, processor 120 may represent the collective processors of the devices and memory 122 may represent the collective memories of the devices. In other implementations, the functionality of similarity evaluator 104 may be integrated into content sources 108, 110 or other devices connected to network 106.

Similarity evaluator 104 may store user identifiers to represent users of computing system 100. A user identifier may be associated with one or more client identifiers. For example, a user identifier may be associated with the network address of client 102 or a cookie that has been set on client 102. A user identifier may be associated with any number of different client identifiers. For example, a user identifier may be associated with a device identifier for client 102 and another client device connected to network 106. In other implementations, a device identifier for client 102 may itself be used in computing system 100 as a user identifier.

A user of client 102 may opt in or out of allowing similarity evaluator 104 to identify and store data relating to client 102 and the user. For example, the user may opt in to receiving content selected by similarity evaluator 104 that may be more relevant to him or her. In one implementation, a client identifier and/or device identifier for client 102 may be randomized and contain no personally-identifiable information about the user of client 102. Thus, the user of client 102 may have control over how information is collected about the user and used by similarity evaluator 104, in various implementations.

In cases in which the user of client 102 opts in to receiving more relevant content, similarity evaluator 104 may determine a similarity score based on how similar a user identifier associated with client 102 is to that of a set of one or more other user identifiers. In some implementations, a similarity score may be determined by similarity evaluator 104 by analyzing signals associated with the set of user identifiers. In general, any data indicative of an online action associated with a user identifier may be used as a signal by similarity evaluator 104. For example, a signal associated with a user identifier may be indicative of visiting a particular web page or website, selecting content, receiving content related to a particular topic, etc. Signals may be stored by similarity evaluator 104 in memory 122 and retrieved by processor 120 to generate similarity scores. In some implementations, signals may be received by similarity evaluator 104 from content sources 108, 110. For example, content source 108 may provide data to similarity evaluator 104 regarding client 102 visiting a web page that is served by content source 108. In further implementations, data regarding online actions associated with client 102 may be provided by client 102 to similarity evaluator 104.

In some implementations, a client device that uses network 106 may provide data regarding an online action to similarity evaluator 104 in response to executing a content tag that is part of a web page from content sources 108, 110. A content tag refers to any piece of web page code associated with or including additional content in conjunction with the web page. For example, a content tag may define a slot on a web page for additional content, a slot for off page content (e.g., interstitial content), whether content should be loaded asynchronously or synchronously, whether the loading of content should be disabled on the web page, whether content that loaded unsuccessfully should be refreshed, the network location of a content source that provides the content (e.g., content sources 108, 110, similarity evaluator 104, etc.), a network location (e.g., a URL) associated with selecting the content (e.g., by clicking on the content, highlighting the content, etc.), how the content is to be rendered on a display, one or more keywords used to retrieve the content, and other functions associated with providing additional content in conjunction with a web page. For example, content source 108 may provide web page data that causes client 102 to contact similarity evaluator 104 when the web page is loaded by client 102. In this way, similarity evaluator 104 may store signal data regarding the visit by client 102 to the web page (e.g., an identifier for the visited web page, an access time for the visited web page, a topic of the web page, etc.).

A set of one or more user identifiers may be evaluated by similarity evaluator 104 to determine how strongly a particular signal relates to the user identifiers in the set. The set may be selected randomly or based on one or more characteristics of the set. For example, the set may be selected for evaluation based on geographic data associated with the set (e.g., user identifiers associated with a particular geographic region), based on one or more signals associated with the identifiers (e.g., user identifiers associated with reviewing content about a certain topic), any other characteristic, or a combination thereof. In some implementations, similarity evaluator 104 may determine the strength of association between a signal and the set using a statistical measure of association. For example, similarity evaluator 104 may determine the strength of association between the set and a particular signal using a point-wise mutual information (PMI) score, a term-frequency inverse-document-frequency (TF-IDF) score, a mutual information score, a Kullback-Leibler divergence score, any other statistical measure of association, or combinations thereof.

In some implementations, similarity evaluator 104 may use signal strength scores to determine the similarity between a user identifier associated with client 102 and that of a set of one or more other user identifiers. In some cases, signals associated with the user identifier may be weighted using the signal strength scores determined by analyzing the set of user identifiers. For example, assume that the set of user identifiers are associated with purchasing a particular product from an online retailer. In such a case, a signal indicative of researching the product may have a high strength score. If the user identifier for client 102 is also associated with this signal, the user identifier may be given a high similarity score in relation to the set by similarity evaluator 104.

A similarity score for a user identifier may be used by similarity evaluator 104, content sources 108, 110, or another computing device connected to network 106 to select relevant content for client 102. In one implementation, similarity evaluator 104 may conduct a content auction in which content providers compete to provide content to client 102. For example, assume that the user identifier associated with client 102 is determined to be similar to a set of user identifiers that purchased golf clubs. In such a case, an online retailer that sells golf clubs may bid in a content auction to provide content in conjunction with a web page being visited by client 102. In some implementations, similarity evaluator 104 may determine a bid on behalf of the content provider based on the similarity score, when similarity evaluator 104 selects content for client 102.

Relevant content may be provided to client 102 by content sources 108, 110 or similarity evaluator 104. For example, similarity evaluator 104 may select relevant content from content source 110 to be included with a web page served by content source 108. In another example, similarity evaluator 104 may provide the selected content to client 102. In some implementations, similarity evaluator 104 may select content stored in memory 114 of client 102. For example, previously provided content may be cached in memory 114, content may be preloaded into memory 114 (e.g., as part of the installation of an application), or may exist as part of the operating system of client 102. In such a case, similarity evaluator 104 may provide an indication of the selection to client 102. In response, client 102 may retrieve the selected content from memory 114 and display it on display 116.

Figure 2:
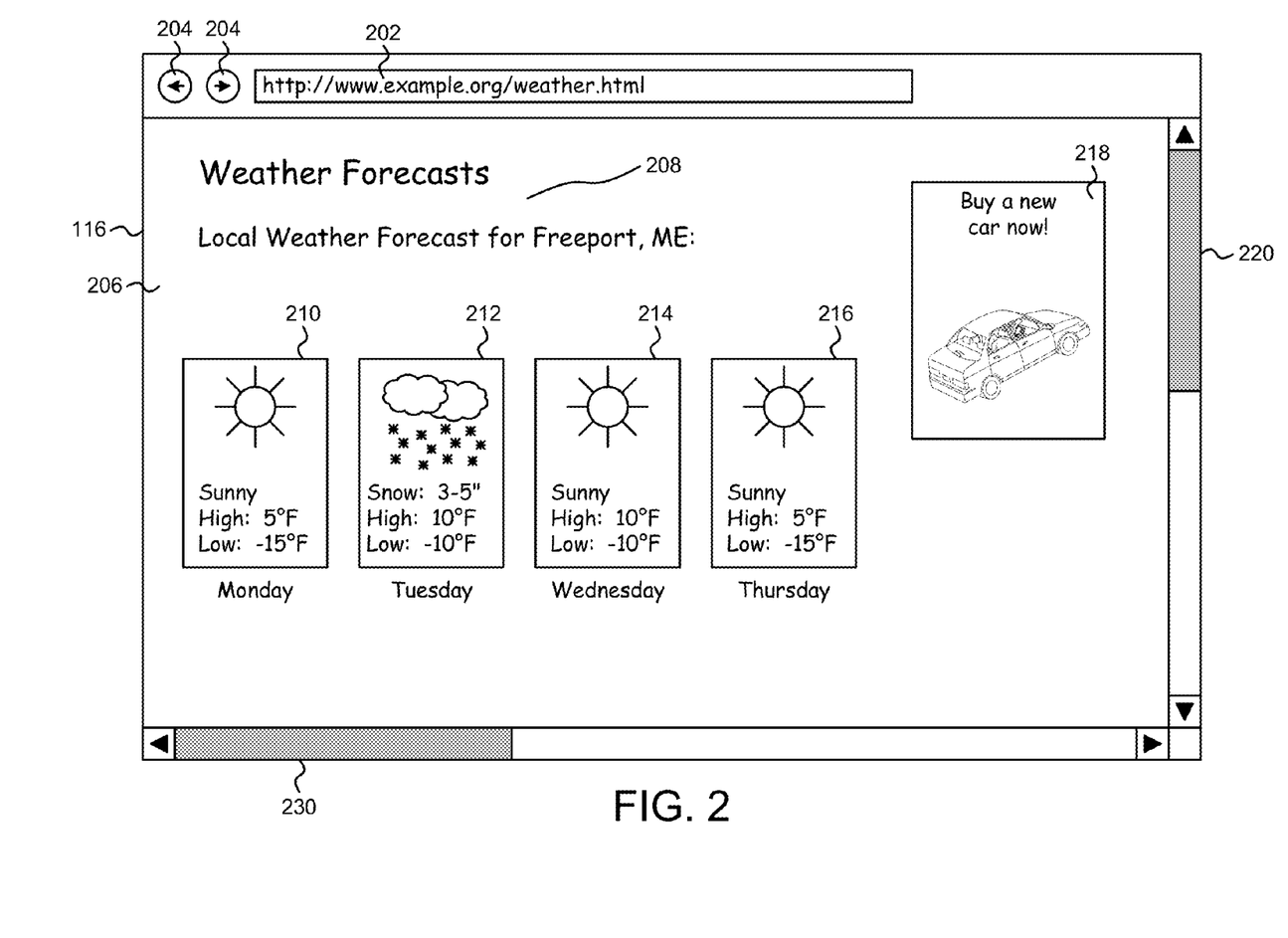
FIG. 2 is an illustration of an electronic display showing an example web page.

Referring now to FIG. 2, an illustration is shown of electronic display 116 displaying an example web page 206. Electronic display 116 is in electronic communication with processor 112 which causes visual indicia to be displayed on electronic display 116. For example, processor 112 may execute a web browser or other application stored in memory 114 of client 102 to display indicia of content received by client 102 via network 106. In various implementations, electronic display 116 may be located inside or outside of the same housing as that of processor 112 and/or memory 114. For example, electronic display 116 may be an external display, such as a computer monitor, television set, or any other stand-alone form of electronic display. In other examples, electronic display 116 may be integrated into the housing of a laptop computer, mobile device, or other form of computing device having an integrated display.

As shown, processor 112 may execute a web browser application and provide display data to electronic display 116. In one implementation, the web browser application may operate by receiving input of a uniform resource locator (URL) via a field 202, from an input device (e.g., a pointing device, a keyboard, a touchscreen, etc.). For example, the URL, http://www.example.org/weather.html, may be entered into field 202. Processor 112 may use the inputted URL to request data from a content source having a network address that corresponds to the entered URL. In response to the request, the content source may return web page data and/or other data to client 102 which may be used by client 102 to cause visual indicia to be displayed by electronic display 116.

In general, web page data may include text, hyperlinks, layout information, and other data that may be used to provide the framework for the visual layout of displayed web page 206. In some implementations, web page data may be one or more files of web page code written in a markup language, such as the hypertext markup language (HTML), extensible HTML (XHTML), extensible markup language (XML), or any other markup language. For example, the web page data in FIG. 2 may include a file, "weather.html" provided by the website, "www.example.org." The web page data may include data that specifies where indicia appear on web page 206, such as text 208. In some implementations, the web page data may also include additional URL information used by the client device to retrieve additional indicia displayed on web page 206. For example, the file, "weather.html," may also include one or more instructions used by processor 112 to retrieve images 210-216 from the content source.

The web browser displayed on electronic display 116 may include a number of navigational controls associated with web page 206. For example, the web browser may include the ability to go back or forward to other web pages using inputs 204 (e.g., a back button, a forward button, etc.). The web browser may also include one or more scroll bars 220, 230, which can be used to display parts of web page 206 that are currently off-screen. For example, web page 206 may be formatted to be larger than the screen of electronic display 116. In such a case, the one or more scroll bars 220, 230 may be used to change the vertical and/or horizontal position of web page 206 on electronic display 116.

Web page 206 may include text, images, or other forms of indicia to convey information to a user of client 102. For example, text 208 may indicate that web page 206 provides information about the weather forecast for Freeport, Me. Similarly, images 210-216 may provide information about the latest weather forecast. For example, image 210 may indicate that the weather is predicted to be sunny on Monday, while image 212 may indicate that snow is predicted for Tuesday. Any combination of text, images, and/or other files may be used by web page 206 to convey information to a user. For example, the weather forecast for Tuesday may be conveyed via text, instead of via image 212.

In one implementation, web page 206 may be configured to include content 218 selected based on a user identifier associated with client 102. In other words, web page 206 may include content 218 when visited by client 102 and different content when visited by another device. In some implementations, one or more content tags may be embedded into the web page code located in the file "weather.html" and/or in other files of web page 206. For example, "weather.html" may include a content tag that specifies that a content field is to be located at the position of content 218. Another content tag may cause processor 112 to request content when web page 206 is loaded from similarity evaluator 104. Such a request may include one or more keywords, a client identifier for client 102, or other data used by similarity evaluator 104 to select content to provide to client 102 and in conjunction with web page 206. In response, similarity evaluator 104 may select content 218. In some cases, similarity evaluator 104 may provide content 218 to client 102. In other cases, similarity evaluator 104 may send a command to client 102 that causes client 102 to retrieve content 218 from a local memory or from a networked content source. In this way, different content may be placed in the location of content 218 on web page 206, based on the device visiting web page 206.

Figure 3:
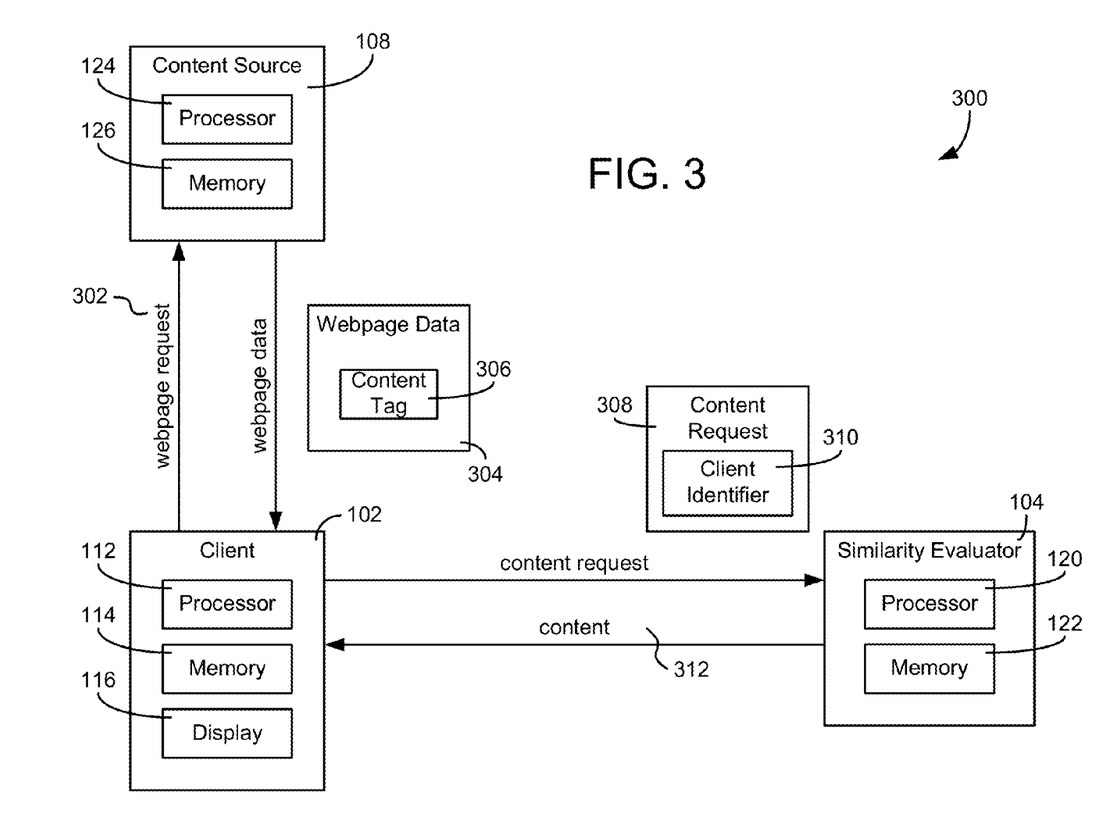
FIG. 3 is an example illustration of content being included on a web page by a similarity evaluator.

FIG. 3 is an example illustration of content 312 being selected by similarity evaluator 104 for inclusion with a web page by a process 300. As shown, client 102 may send a web page request 302 to a content source via network 106, such as content source 108. For example, web page request 302 may be a request that conforms to the hypertext transfer protocol (HTTP), such as the following:

GET/weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with web page request 302 to identify client 102 to content source 108.

In response to receiving web page request 302, content source 108 may return web page data 304, such as the requested file, "weather.html." Web page data 304 may be configured to cause client 102 to display a web page on electronic display 116 when opened by a web browser application. In some cases, web page data 304 may include code that causes client 102 to request additional files to be used as part of the displayed web page. For example, web page data 304 may include an HTML image tag of the form:

<img src="Monday_forecast.jpg">

Such code may cause client 102 to request the image file "Monday_forecast.jpg," from content source 108.

In some implementations, web page data 304 may include content tag 306 configured to cause client 102 to retrieve content from similarity evaluator 104. In some cases, content tag 306 may be an HTML image tag that includes the network location of similarity evaluator 104. In other cases, content tag 306 may be implemented using a client-side scripting language, such as JavaScript. For example, content tag 306 may be of the form:

<script type='text/javascript'>
ContentNetwork_RetrieveContent("argument")
</script> where ContentNetwork_RetrieveContent is a script function that causes client 102 to send a content request 308 to similarity evaluator 104. In some cases, the argument of the script function may include the network address of similarity evaluator 104, the referring web page, and/or additional information that may be used by similarity evaluator 104 to select content to be included with the web page.

According to various implementations, the user of client 102 may opt in to receiving content determined to be relevant to the user. In such a case, content request 308 may include a client identifier 310, used by similarity evaluator 104 to identify client 102 and/or a user identifier associated with client 102. In various implementations, client identifier 310 may be an HTTP cookie previously set by similarity evaluator 104 on client 102, the IP address of client 102, a unique device serial number for client 102, other forms of identification information, or combinations thereof. For example, similarity evaluator 104 may set a cookie that includes a unique string of characters on client 102 when content is first requested by client 102 from similarity evaluator 104. Such a cookie may be included in subsequent content requests sent to similarity evaluator 104 by client 102.

In some implementations, client identifier 310 may be used by similarity evaluator 104 to store signal data indicative of online actions performed using client 102. For example, content request 308 may include data relating to which web page was requested by client 102, when the web page was requested, and/or other browsing history data. In this way, similarity evaluator 104 is able to reconstruct at least a portion of the online history of client 102. In some implementations, similarity evaluator 104 may also receive signal data from other entities that do not include content selected by similarity evaluator 104. For example, a website that does include content from similarity evaluator 104 may nonetheless provide information about client 102 visiting the website to similarity evaluator 104.

In some cases, client identifier 310 may be sent to similarity evaluator 104 when the user of client 102 performs certain online actions. For example, web page data 304 may include a tag that causes client 102 to send client identifier 310 to similarity evaluator 104 when the user selects displayed content. Client identifier 310 may also be used to store information about client 102 being redirected to another web page. For example, client 102 may be redirected to a content provider's website if the user selects displayed content. In such a case, client identifier 310 may also be used to record which actions were performed on the content provider's website. For example, client identifier 310 may be sent to similarity evaluator 104 when the user of client 102 navigates the content provider's website. In this way, data regarding whether the user searched for a product, added a product to a shopping cart, completed a purchase on the content provider's website, etc., may also be stored by similarity evaluator 104.

Similarity evaluator 104 may use signal data for the user identifier associated with client 102 to determine how similar the user identifier is to a set of one or more other user identifiers. In various implementations, similarity evaluator 104 may use statistical analysis on signal data associated with the set to determine the strength of association between a signal and the set. For example, if 85% of user identifiers in the set visited a particular web page, this signal may be weighted highly. Similarity evaluator 104 may apply signal weights to the signals for the user identifier associated with client 102. The signal weights may then be used to determine a measure of similarity between the user identifier associated with client 102 and that of the set.

In response to receiving content request 308, similarity evaluator 104 may select content 312 to be returned to client 102 based on the similarity score for its associated user identifier. In some implementations, a content provider may participate in an auction to provide content to client 102. For example, a content provider may specify a set of one or more user identifiers and utilize similarity evaluator 104 to determine how similar the set is to that of the user identifier for client 102. If an auction process is used by similarity evaluator 104 to select content for client 102, the content provider's bid in the auction may be based on the determined similarity score. For example, assume that the set of user identifiers specified by the content provider is associated with buying a particular product. If the signals for the user identifier associated with client 102 are similar to that of the set, the content provider may bid in an auction to provide content 312 to client 102.

Figure 4:
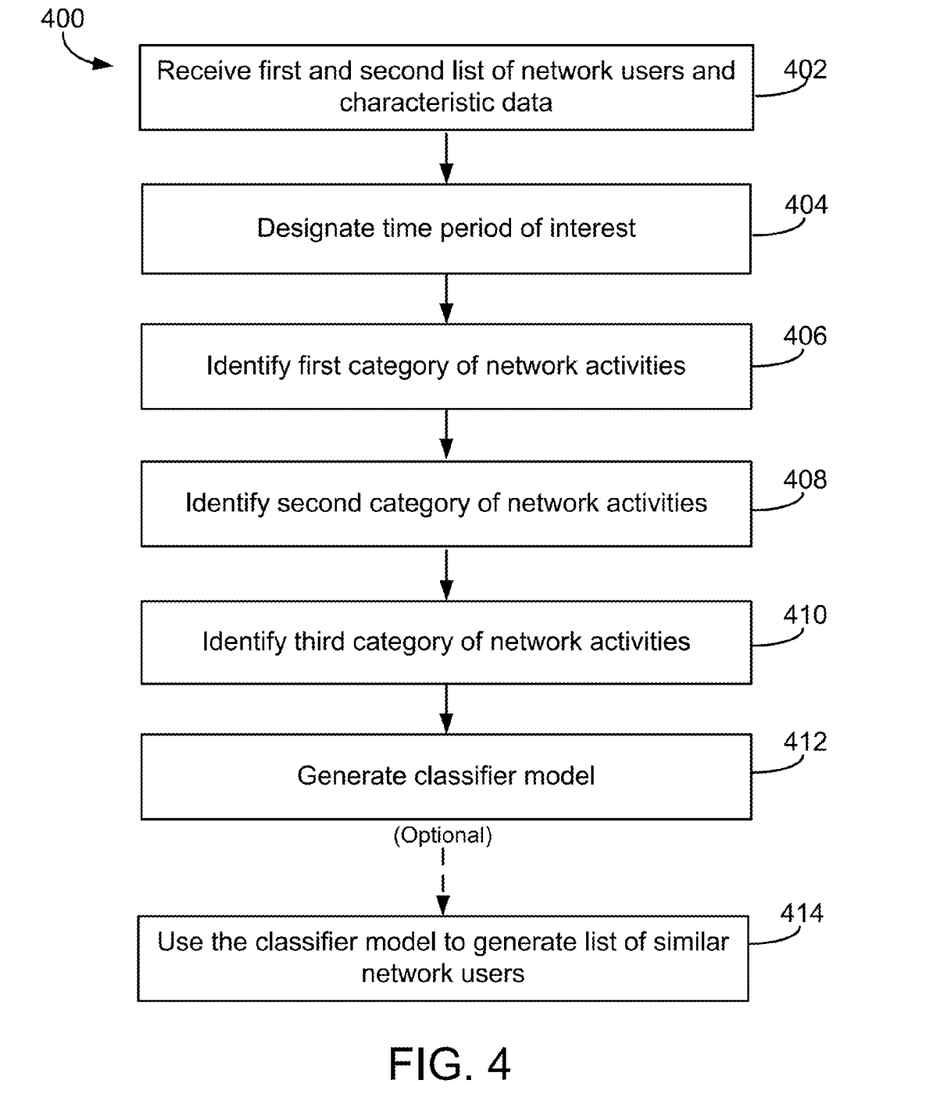
FIG. 4 is an example process for creating a classifier model to determine whether a network user should be added to a list of similar network users.

In some implementations, as illustrated in FIG. 4, the processing circuit performs process 400 for creating a classifier model to determine whether a network user should be added to a list of similar network users. Process 400 may be implemented by a content server or other computing device having access to some or all of a network user's history data.

Process 400 includes receiving a first list of network users and a second list of network users who have not been on the first list of network users. Each network user is represented on the first and second list by a user identifier and characteristic data associated with the network user's network activity (block 402). Characteristic data may include, but are not limited to, web pages visited, topics in the web pages, salient keywords in the web pages, content displayed on the web pages, content clicked on, search terms entered for searches performed, products purchased, users' geography, users' demography, etc.

Process 400 further includes designating a time period of interest to the classifier model (block 404). The time period can be any suitable time period, for example, a duration of minutes, hours, days, weeks, months, years, etc. In one implementation, the designated time period is preferably a duration from fifteen minutes before each network user on the list of network users was added to the list of network users and five minutes after each network user on the list of network users was added to the list of network users.

In one implementation, process 400 also includes identifying a first category of network activities (block 406), a second category of network activities (block 408) and a third category of network activities (block 410). In another implementation, only the first and second categories of network activities are identified. In yet another implementation, only the first and third categories of network activities are identified. The process for identifying the first, second and third categories of network activities will be described in further detail below.

In addition, process 400 includes generating a classifier model (block 412). The process for generating the classifier model will be described in further detail below. Process 400 may optionally include using the classifier model to generate a list of similar network users, similar to the network users on the list of network users (block 414). In other words, similar network user identifiers do not appear in the list of network user identifiers. The list of similar network users is generated by a computing device, such as the similarity evaluator 104 described above (See FIG. 1).

In order to generate a classifier model, the processing circuit defines positive and negative examples based on a network user's network activity at a given time. The positive and negative examples may be: 1) userlist-based in an approach referred to a userlist-based positive/negative generation, 2) activity-based in an approach referred to as activity-based positive/negative generation or 3) a combination of the two approaches.

Figure 5:
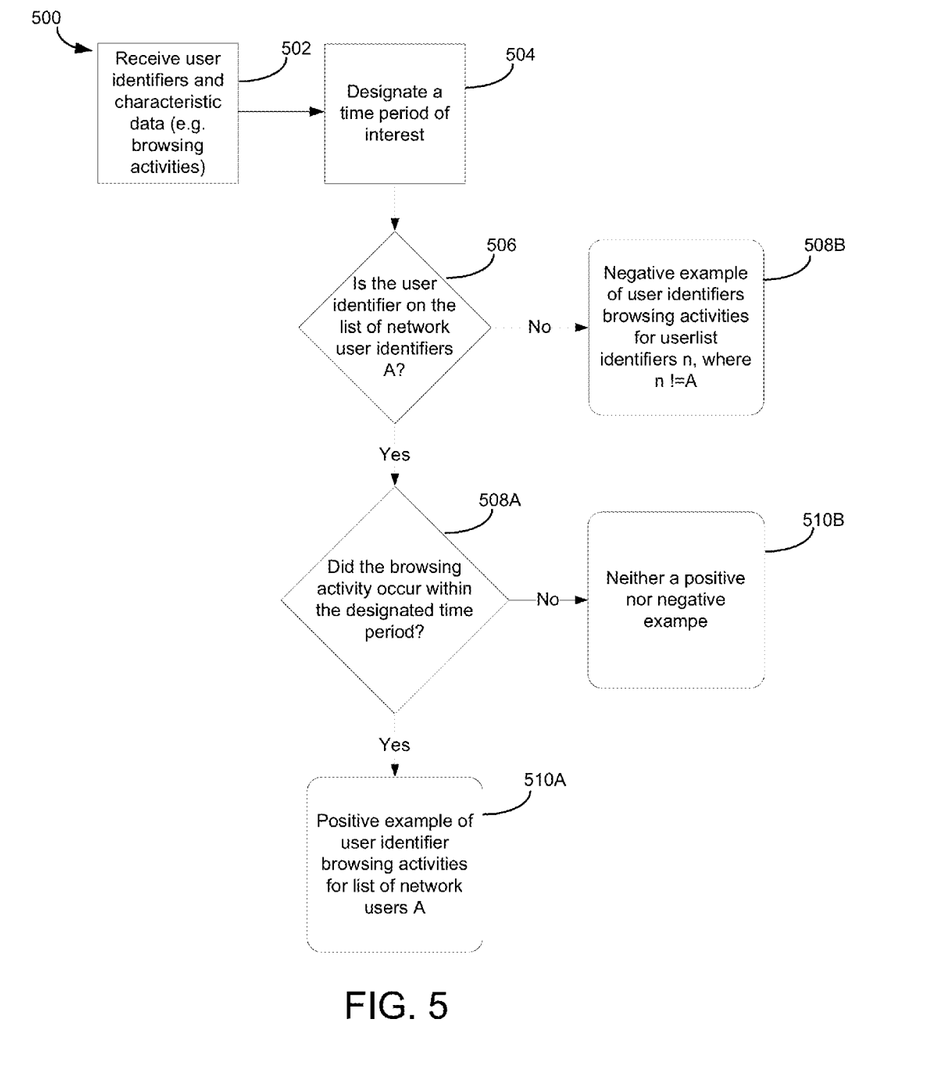
FIG. 5 is an example process for identifying positive and negative examples in a userlist-based positive/negative generation approach.

In some implementations, as illustrated in FIG. 5, the processing circuit performs process 500 for generating the first and second categories of network activities according to the userlist-based positive/negative generation approach. Process 500 may be implemented by a content server or other computing device having access to some or all of a network user's history data.

Process 500 includes receiving a first list of network user identifiers and a second list of network user identifiers who have not been on the first list of network user identifiers and characteristic data associated with each network user's network activity (block 502). The network activity may be, for example, the network user's browsing activities. The first list of network user identifiers includes a corresponding time period in which a user identifier was added to the first list of network users because of the user identifier's network activity during the corresponding time period. For example, user1 is added the first list of network users because of his/her activities during T1, user2 is added to the first list of network users because of his/her activities during T2 and user3 is added to the first list of network users because of his/her activities during T1. Therefore, in this example, the first list of network users is the set: {(user1, T1), (user2, T2), (user3, T1)}. In the same example, the second list of network users may be the set:

{user4, user5, user6} because user3, user4 and user5 do not appear on the first list of network users.

The processing circuit designates a time period of interest, for example a time period T1 (block 504). The processing circuit determines whether a network user identifier is on the first list of network users, for example, a list of network user identifiers A (block 506). If the network user identifier is not on the list of network user identifiers A, the network user identifier and associated characteristic data is included in the second category of network activities. The second category of network activities represents negative examples of user identifier browsing activities for the list of network user identifiers A (block 508B). Specifically, the second category of network activities includes network activities performed at any time by network users who are on the second list of network users. If the network user identifier is on the list of network user identifiers A, the processing circuit determines whether the network user identifier's browsing activity occurred within the designated time period T1 (block 508A). If the network user identifier's browsing activity occurred outside of designated time period T1, the user identifier is neither a positive nor negative example (block 508B). If the network user identifier's browsing activity occurred outside of the designated time period T1, the network user identifier and associated characteristic data are neither a positive nor negative example (block 510B). If the network user identifier's browsing activity occurred within the designated time period T1, the network user identifier and associated characteristic data are included in the first category of network activities. The first category of network activities represents positive examples of user identifier browsing activities for the first list of network users (e.g. the list of network user identifiers A) (block 510A). Specifically, the first category of network activities includes network activities performed by a network user on the first list of network users within the designated time period.

For example, a network user (user1) is on a remarketing list for his/her browsing activity during a time period T1 before and after the user is added to the remarketing list. In this example of userlist-based positive/negative generation, if the processing circuit designates T1 as the designated time period, any activity performed by user1 during the designated time period T1 is a positive example (e.g. falls under the first category of network activities). In this example, consider user2, a user who has not been on the remarketing list. In userlist-based positive/negative generation, negative examples (e.g. the second category of network activities) are defined as any activity performed by a user, such as user2, who has never been on the remarketing list, but exists in an advertising network. For instance, the user may exist on another remarketing list that is not the subject of the classifier model. In other words, the processing circuit identifies the user and associated browsing activity as a negative example if the user's user identifier is not listed on the remarketing list.

Figure 6:
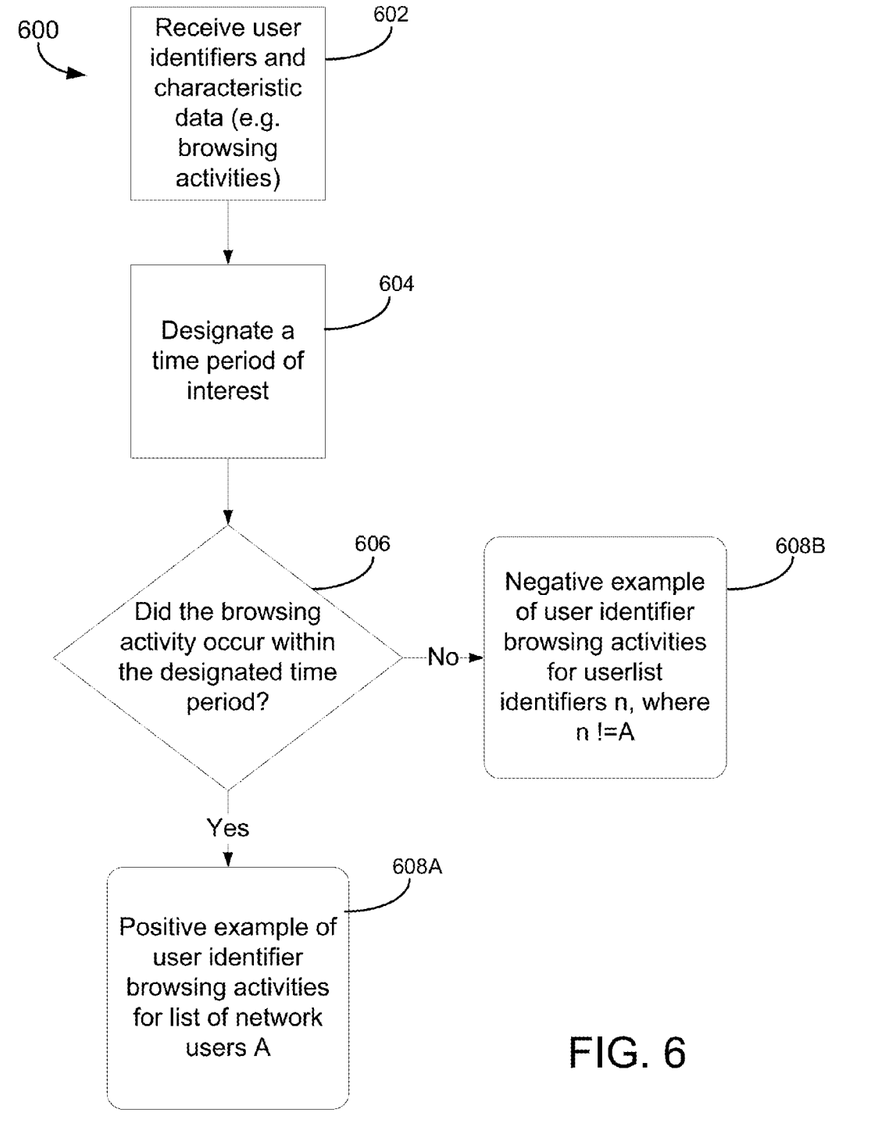
FIG. 6 is an example process for identifying positive and negative examples in an activity-based positive/negative generation approach.

In one example, pseudocode for the userlist-based positive/negative generation approach is as follows:

Input: network activities: U={u_1, u_2, . . . , u_n}
　　seed lists: UL={ul_1, ul_2, . . . , ul_m}
Output: positive userlist PUL={pul_1, pul_2, . . . , pul_m}
　　negative userlist NUL={nul_1, nul_2, . . . , nul_m}
for l: 1 to m do
　for i: 1 to n do
　　if (u_i\in ul_1) then
　　　pul_1←u_i
　　else
　　　nul_1←u_i
　　end if
done done In some implementations, as illustrated in FIG. 6, the processing circuit performs process 600 for generating the first and third categories of network activities according to the activity-based positive/negative generation approach. Process 600 may be implemented by a content server or other computing device having access to some or all of a network user's history data.

Process 600 includes receiving a first list of network user identifiers (i.e. the list of network users A) and characteristic data associated with each network user's network activity (block 602). The network activity may be, for example, the network user's browsing activities. The first list of network user identifiers includes a corresponding time period in which a user identifier was added to the first list of network users because of the user identifier's network activity during the corresponding time period. The processing circuit designates a time period of interest (block 604). The processing circuit then determines whether a browsing activity occurred within or outside of the designated time period (block 606). If the browsing activity occurred within the designated time period, the network user identifier and associated characteristic data is included in the first category of network activities. The first category of network activities represents positive examples of user identifier browsing activities for the list of network users A (block 608A). Specifically, the first category of network activities includes network activities performed by a network user on the first list of network users within the designated time period. If the browsing activity occurred outside of the designated time period, the network user identifier and associated characteristic data is included in the third category of network activities. The third category of network activities represents negative examples of user identifier browsing activities for the list of network users A (block 606B). Specifically, the third category of network activities includes network activities performed at any time by network users on the first list of network users at a time outside of the designated time period.

For example, a network user (user1) is on a remarketing list for his/her browsing activity during a designated time period T1 before and after the user is added to the remarketing list. In this example, also consider a time period T2 that is outside of T1. In this example of activity-based positive/negative generation, positive examples (e.g. the first category of network activities) are defined as any activity performed by user1 during T1. In activity-based positive/negative generation, negative examples are defined as any activity performed by user1 during T2. In other words, the processing circuit identifies the user and associated browsing activity as a negative example if the browsing activity is performed by the user outside of the designated time period.

Figure 7:
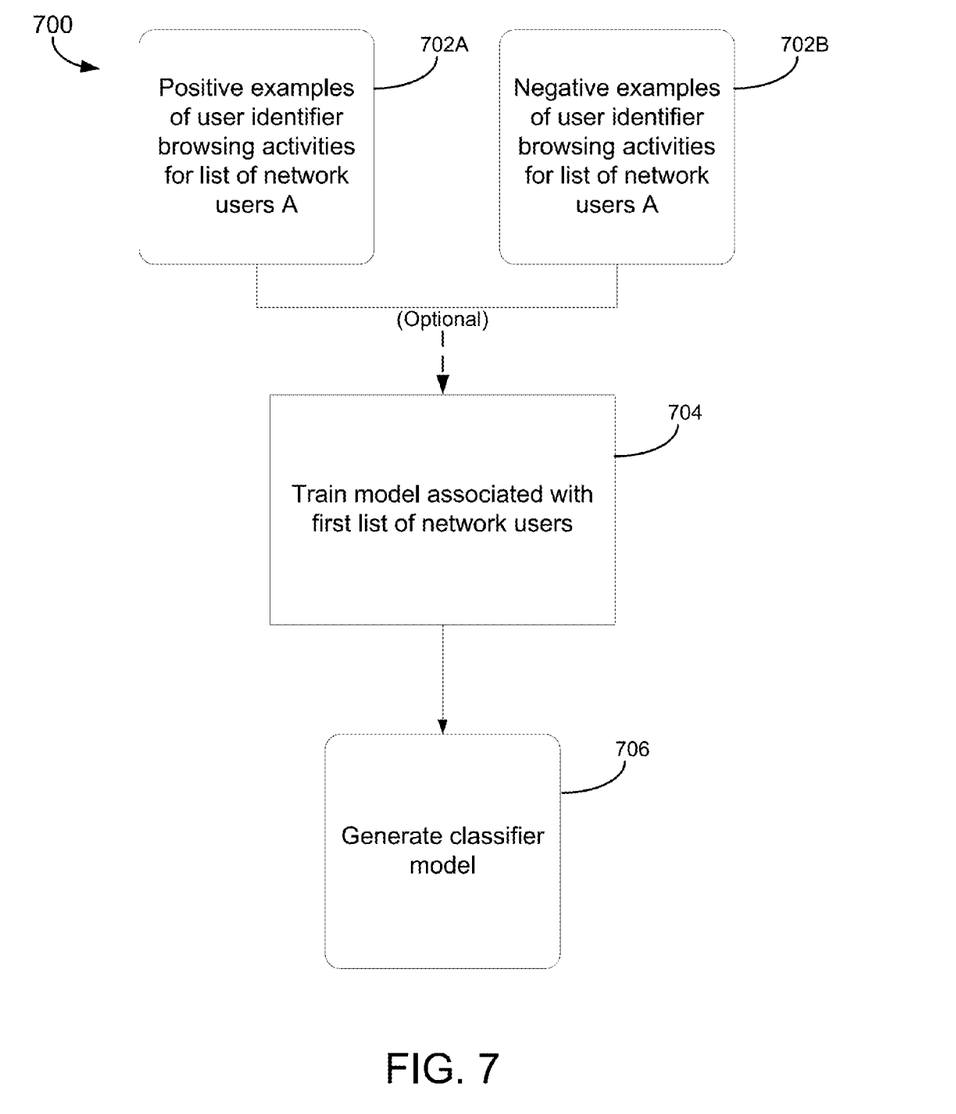
FIG. 7 is an example process for combining the positive and negative examples of FIGS. 5-6 to generate the classifier model of FIG. 4.

In one example, pseudocode for the activity-based positive/negative generation approach is as follows:

Input: network activities: U={u_1, u_2, . . . , u_n}
　　seed lists: UL={ul_1, ul_2, . . . , ul_m}
Output: positive userlist PUL={pul_1, pul_2, . . . , pul_m}
　　negative userlist NUL={nul_1, nul_2, . . . , nul_m}
for l: 1 to m do
　for i: 1 to n do
　　if (u_i.user_id\in ul_1.user_id) then
　　　if (u_i\in ul_1) then
　　　　pul_1←u_i
　　　else
　　　　nul_1←u_i
　　　end if
　　end if
done
done In some implementations, as illustrated in FIG. 7, the processing circuit performs process 700 for generating the classifier model. Process 700 may be implemented by a content server or other computing device having access to some or all of a network user's history data.

Process 700 includes receiving the positive examples of user identifier browsing activities (e.g. the first category of network activities) (block 702A) and the negative examples of user identifier browsing activities (e.g. the second and third categories of network activities) (block 702B). In one implementation, the positive and negative examples may optionally be used to train a model associated with the first list of network users (e.g. the remarketing list) (block 704). The trained model may become the classifier model. In another implementation, the classifier model is constructed from the positive and negative examples (block 706). The classifier model may be used to classify other user browsing activities if they are similar to or have similar intended interests as those associated with the users on the remarketing list provided by the content provider.

In some implementations, the processing circuit may generate display data configured to display at least one of the first list of network users, the second list of network users, the first category of network activities, the second category of network activities, the third category of network activities and the list of similar network users on a user interface.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of creating a classifier model, the method comprising:
   receiving, at a processing circuit, a first list of network device identifiers and a second list of network device identifiers that are not on the first list of network device identifiers, the first list of network device identifiers including data characteristic of network activity performed at a device associated with the network device identifier including a time period at which a network activity was performed;
   designating, by the processing circuit, a time period of interest to the classifier model;
   identifying, by the processing circuit, a first category of network activities that includes at least one network activity performed by a device associated with a network device identifier on the first list of network device identifiers within the designated time period;
   identifying, by the processing circuit, a second category of network activities that includes at least one network activity performed at any time period by network device identifiers on the second list of network device identifiers;
   identifying, by the processing circuit, a third category of network activities that includes at least one network activity performed by network device identifiers on the first list of network device identifiers at a time outside of the designated time period, the second category of network activities and the third category of network activities represent examples of data characteristic of network activity performed at a device associated with a network device identifier that should not be added to the list of similar network device identifiers;
   generating, by the processing circuit, the classifier model based on the first, second and third categories of network activities; and
   adding, by the processing circuit, a second network device identifier to a list of similar network device identifiers based on the generated classifier model, the list of similar network device identifiers comprising network device identifiers that are not on the first list of network device identifiers.

2. The method of claim 1, wherein the first category of network activities represents examples of data characteristic of network activity performed at a device associated with a network device identifier that should be added to the list of similar network device identifiers.

3. The method of claim 1, wherein the designated time period is between fifteen minutes before a network device on the first list of network device identifiers was added to the first list of network device identifiers and five minutes after the network device identifier on the first list of network device identifiers was added to the first list of network device identifiers.

4. The method of claim 1, further comprising using the classifier model to generate the list of similar network device identifiers, the list of similar network device identifiers comprising network device identifiers that are not on the first list of network device identifiers.

5. The method of claim 4, further comprising generating display data configured to display at least one of the first list of network device identifiers, the second list of network device identifiers, the first category of network activities, the second category of network activities, the third category of network activities and the list of similar network device identifiers on a user interface.

6. The method of claim 1, wherein the first list of network device identifiers is provided by a content provider.

7. A computerized method of creating a classifier model, the method comprising:
 receiving, at a processing circuit, a first list of network device identifiers and a second list of network device identifiers that are not on the first list of network device identifiers, the first list of network device identifiers including data characteristic of network activity performed at a device associated with the network device identifier including a time period at which a network activity was performed;
 designating, by the processing circuit, a time period of interest to the classifier model;
 identifying, by the processing circuit, a first category of network activities that includes at least one network activity performed by a device associated with a network device identifier on the first list of network device identifiers within the designated time period;
 identifying, by the processing circuit, a second category of network activities that includes at least one network activity performed at any time period by network devices associated with network device identifiers on the second list of network device identifiers, the second category of network activities represents examples of data characteristic of network activity performed at a device associated with a network device identifier that should not be added to the list of similar network device identifiers;
 generating the classifier model based on the first and second categories of network activities; and
 adding, by the processing circuit, a second network device identifier to a list of similar network device identifiers based on the generated classifier model, the list of similar network device identifiers comprising network device identifiers that are not on the first list of network device identifiers.

8. The method of claim 7, wherein the first category of network activities represents examples of data characteristic of network activity performed at a device associated with a network device identifier that should be added to the list of similar network device identifiers.

9. The method of claim 7, wherein the designated time period is between fifteen minutes before a network device on the first list of network device identifiers was added to the first list of network device identifiers and five minutes after the network device identifier on the first list of network device identifiers was added to the first list of network device identifiers.

10. The method of claim 7, further comprising using the classifier model to generate the list of similar network device identifiers, the list of similar network device identifiers comprising network device identifiers that are not on the first list of network device identifiers.

11. The method of claim 10, further comprising generating display data configured to display at least one of the first list of network device identifiers, the second list of network device identifiers, the first category of network activities, the second category of network activities and the list of similar network device identifiers on a user interface.

12. The method of claim 7, wherein the first list of network device identifiers is provided by a content provider.

13. A computerized method of creating a classifier model, the method comprising:
 receiving, at a processing circuit, a first list of network device identifiers and a second list of network device identifiers that are not on the first list of network device identifiers, the first list of network user identifiers including data characteristic of network activity performed at a device associated with the network device identifier including a time period at which a network activity was performed;
 designating, by the processing circuit, a time period of interest to the classifier model;
 identifying, by the processing circuit, a first category of network activities that includes at least one network activity performed by a device associated with a network device identifier on the first list of network device identifiers within the designated time period;
 identifying, by the processing circuit, a second category of network activities that includes at least one network activity performed by network devices associated with network device identifiers on the first list of network device identifiers at a time outside of the designated time period, the second category of network activities represents examples of data characteristic of network activity performed at a device associated with a network device identifier that should not be added to the list of similar network device identifiers;
 generating, by the processing circuit, the classifier model based on the first and second categories of network activities; and
 adding, by the processing circuit, a second network device identifier to a list of similar network device identifiers based on the generated classifier model, the list of similar network device identifiers comprising network device identifiers that are not on the first list of network device identifiers.

14. The method of claim 13, wherein the first category of network activities represents data characteristic of network activity performed at a device associated with a network device identifier that should be added to the list of similar network device identifiers.

15. The method of claim 13, wherein the designated time period is between fifteen minutes before a network device on the first list of network device identifiers was added to the first list of network device identifiers and five minutes after the network device identifier on the first list of network device identifiers was added to the first list of network device identifiers.

16. The method of claim 13, further comprising using the classifier model to generate a list of similar network device identifiers, the list of similar network device identifiers comprising network device identifiers that are not on the first list of network device identifiers.

17. The method of claim 16, further comprising generating display data configured to display at least one of the first list of network user identifiers, the first category of network activities, the second category of network activities and the list of similar network device identifiers on a user interface.

18. The method of claim 13, wherein the first list of network device identifiers is provided by a content provider.

* * * * *